United States Patent
Nonogaki (10) Patent No.: US 10,058,083 B2
(45) Date of Patent: Aug. 28, 2018

(54) ELECTRIC FISHING REEL

(71) Applicant: Globeride, Inc., Tokyo (JP)

(72) Inventor: Motohiro Nonogaki, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/450,179

(22) Filed: Mar. 6, 2017

(65) Prior Publication Data

US 2017/0280697 A1  Oct. 5, 2017

(30) Foreign Application Priority Data

Mar. 31, 2016  (JP) ................................. 2016-071906

(51) Int. Cl.
| | |
|---|---|
| *A01K 89/01* | (2006.01) |
| *A01K 89/017* | (2006.01) |
| *A01K 89/015* | (2006.01) |
| *H02K 5/10* | (2006.01) |
| *H02K 5/18* | (2006.01) |

(Continued)

(52) U.S. Cl.
CPC ........ *A01K 89/017* (2013.01); *A01K 89/0192* (2015.05); *H02K 5/10* (2013.01); *H02K 5/18* (2013.01); *H02K 5/20* (2013.01); *H02K 7/14* (2013.01)

(58) Field of Classification Search
CPC .............. A01K 89/017; A01K 89/0173; A01K 89/0192
See application file for complete search history.

(56) References Cited

U.S. PATENT DOCUMENTS 3,017,134 A * 1/1962 Duvallo ............... A01K 89/017
  242/249
4,784,346 A * 11/1988 Steffan ................. A01K 89/017
  242/250

(Continued)

FOREIGN PATENT DOCUMENTS

| JP | 08-242734 | 9/1996 |
|---|---|---|
| JP | 2535363 | 5/1997 |

(Continued)

OTHER PUBLICATIONS

Non-Final Office Action Taiwanese Patent Application No. 106107307 dated Sep. 29, 2017 with English translation.

(Continued)

*Primary Examiner* — Emmanuel Monsayac Marcelo
(74) *Attorney, Agent, or Firm* — Pillsbury Winthrop Shaw Pittman, LLP (57) ABSTRACT

One object is to provide an electric fishing reel wherein it is possible to prevent fingers of a user from contacting with an electric motor and improve heat releasing performance of the electric motor. In accordance with one aspect, an electric fishing reel of the present invention includes: a reel body; a spool provided on the reel body and configured to have a fishing line wound thereon; an electric motor provided in a front portion of the reel body and configured to rotationally drive the spool; and a cover member mounted on the reel body so as to surround the electric motor, wherein the cover member includes a front portion in front of the electric motor and a side portion on a side of the electric motor, and at least one of the front portion and the side portion of the cover member has an opening formed therein.

8 Claims, 11 Drawing Sheets

(51) Int. Cl.
*H02K 5/20* (2006.01)
*H02K 7/14* (2006.01)

(56) References Cited

U.S. PATENT DOCUMENTS

| | | | | |
|---|---|---|---|---|
| 4,932,602 | A * | 6/1990 | Scott | A01K 91/08 242/250 |
| 6,045,076 | A * | 4/2000 | Daniels | A01K 89/015 188/268 |
| 9,661,835 | B1 * | 5/2017 | Sandstrom | A01K 89/017 |
| 2003/0038200 | A1 * | 2/2003 | Chiba | A01K 89/017 242/249 |
| 2004/0104863 | A1 * | 6/2004 | Hitomi | A01K 89/00 345/1.1 |
| 2005/0162976 | A1 * | 7/2005 | Kuriyama | A01K 89/00 367/111 |
| 2008/0173744 | A1 * | 7/2008 | Terauchi | A01K 89/017 242/250 |
| 2013/0026276 | A1 * | 1/2013 | Jyo | A01K 89/017 242/250 |
| 2015/0083840 | A1 * | 3/2015 | Kawamata | A01K 89/017 242/250 |

FOREIGN PATENT DOCUMENTS

| | | | |
|---|---|---|---|
| JP | 2008200025 A | * | 9/2008 |
| JP | 2009284793 A | * | 12/2009 |
| JP | 2013046580 A | * | 3/2013 |
| JP | 2015057997 A | * | 3/2015 |
| TW | 201400011 A | | 1/2014 |
| TW | 201424583 A | | 7/2014 |

OTHER PUBLICATIONS

Taiwanese Office Action in connection with Taiwanese Patent Application No. 106107307 dated Apr. 13, 2018 and English translation thereof.

* cited by examiner

ELECTRIC FISHING REEL

CROSS-REFERENCE TO RELATED APPLICATIONS

This application is based on and claims the benefit of priority from Japanese Patent Application Serial No. 2016-071906 (filed on Mar. 31, 2016), the contents of which are hereby incorporated by reference in their entirety.

TECHNICAL FIELD

The invention relates to an electric fishing reel including an electric motor for driving.

BACKGROUND

An electric fishing reel typically includes an electric motor for wind-driving of a spool rotatably supported between side plates of a reel body. In fishing, an electric fishing reel is required to wind a large amount of fishing line subjected to a tension produced by a sinker, a tackle, a fish, etc. The electric motor of an electric fishing reel is surrounded by the side plates and the spool, resulting in unsatisfactory heat release performance. Thus, when a large amount of fishing line being tensed is wound, the electric motor tends to heat and reduce its performance, degrading the winding efficiency.

One example of electric fishing reels having an improved heat release performance of an electric motor is disclosed in Japanese Patent Application Publication No. Hei 8-242734 (hereinafter "the '734 Publication"). The electric fishing reel of the '734 Publication includes a motor casing that houses the electric motor and a heat releasing member mounted on the motor casing. In the electric fishing reel of the '734 Publication, the heat produced in the electric motor during driving can be released to the outside air through the heat releasing member.

However, in the electric fishing reel of the '734 Publication, the heat releasing member mounted on the reel body is naked, fingers of a user may accidentally contact with the heat releasing member during fishing. There have been demands for solving this problem. In addition, depending on the shape of the heat releasing member, a slackened fishing line may be entangled on the heat releasing member, reducing the fishing operability.

SUMMARY

The present invention is intended to overcome the above problem, and one object thereof is to provide an electric fishing reel wherein fingers are prevented from contacting with a motor casing and the heat releasing performance of the motor casing is improved.

An electric fishing reel of the present invention that addresses such a problem comprises: a reel body; a spool provided on the reel body and configured to have a fishing line wound thereon; an electric motor provided in a front portion of the reel body and configured to rotationally drive the spool; and a cover member mounted on the reel body so as to surround the electric motor, wherein the cover member includes a front portion in front of the electric motor and a side portion on a side of the electric motor, and at least one of the front portion of the cover member and the side portion of the cover member has an opening formed therein.

According to this electric fishing reel, the electric motor is covered by the cover member, and the heat produced by the electric motor can be released into the outside air through the opening formed in the cover member.

In the electric fishing reel, the front portion of the cover member may preferably be made of a front side plate disposed on the front portion of the reel body. With this arrangement, the heat produced by the electric motor can be released into the outside air in front of the reel body through the opening of the front side plate.

In the electric fishing reel, the front side plate may include: a window hole for guiding a fishing line disposed above the opening and extending in an axial direction of the spool; and an inclined portion disposed between the opening and the window hole, the inclined portion being inclined down in a frontward direction. With this arrangement, waterdrops adhered to the fishing line can be dropped onto the inclined portion when the fishing line being wound passes through the window hole. The waterdrops dropped onto the inclined portion may flow down the inclined portion into the opening. Thus, the waterdrops flowing into the opening may suitably cool the electric motor.

In the electric fishing reel, the opening may preferably extend in the axial direction of the spool in conformity to the window hole. With this arrangement, the waterdrops dropped from the fishing line passing through the window hole onto a region across the length of the window hole may flow down the inclined portion and enter the opening when it comes to a region across the length of the opening. Thus, the region of the electric motor across the length of the opening can be cooled by the waterdrops.

In the electric fishing reel, the side portion of the cover member may preferably be made of a side plate disposed on a side portion of the reel body. With this arrangement, the heat produced by the electric motor can be released into the outside air on a side of the reel body through the opening of the side plate.

In the electric fishing reel, a heat releasing member for receiving heat from the electric motor may preferably be disposed inside the opening. With this arrangement, the heat produced by the electric motor can be released into the outside air through the heat releasing member and the opening.

According to the electric fishing reel of the present invention, the electric motor is covered by the cover member, and the heat produced by the electric motor can be released into the outside air through the opening formed in the cover member. Therefore, it may be possible to prevent fingers of a user from contacting with the electric motor and improve the heat releasing performance of the electric motor. This may enhance the fishing operability and the durability of the electric motor.

Since the ordinary members such as the front side plate and the side plate include the openings, the heat produced by the electric motor can be released into the outside air, thus improving the heat releasing performance of the electric motor without major design modification.

Since the electric motor can be cooled using the waterdrops adhered to the fishing line being wound, it may be possible to prevent fingers of a user from contacting with the electric motor and improve the heat releasing performance of the electric motor.

Since the region of the electric motor across the length of the opening can be cooled using the waterdrops dropped from the fishing line passing through the window hole onto a region across the length of the window hole, it may be possible to prevent fingers of a user from contacting with the electric motor and improve the heat releasing performance of the electric motor.

With the arrangement including the heat releasing member, the heat produced by the electric motor can be suitably released into the outside air through the heat releasing member and the opening, and it may be possible to prevent fingers of a user from contacting with the electric motor and improve the heat releasing performance of the electric motor.

DESCRIPTION OF EXAMPLE EMBODIMENTS

Embodiments of an electric fishing reel according to the present disclosure will be hereinafter described with reference to the drawings. As used herein, "front-rear" and "left-right" directions refer to the directions shown in FIGS. 1 and 2, and a "top-bottom" direction refer to the direction shown in FIG. 2.

Figure 1:
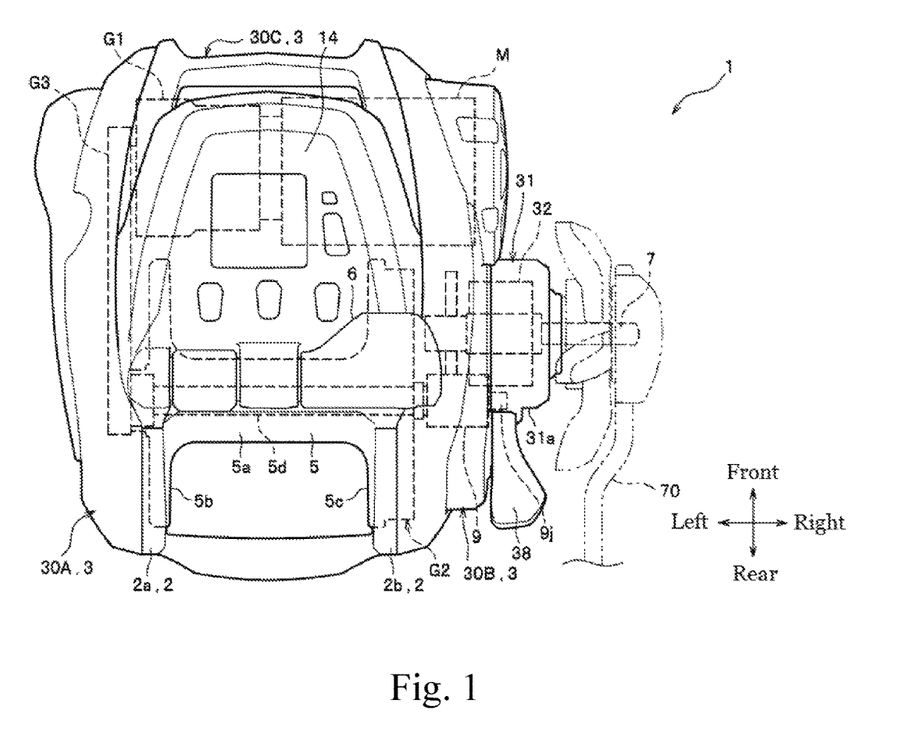
FIG. 1 is a plan view of an electric fishing reel according to an embodiment of the present invention (partially omitted).
Figure 2:
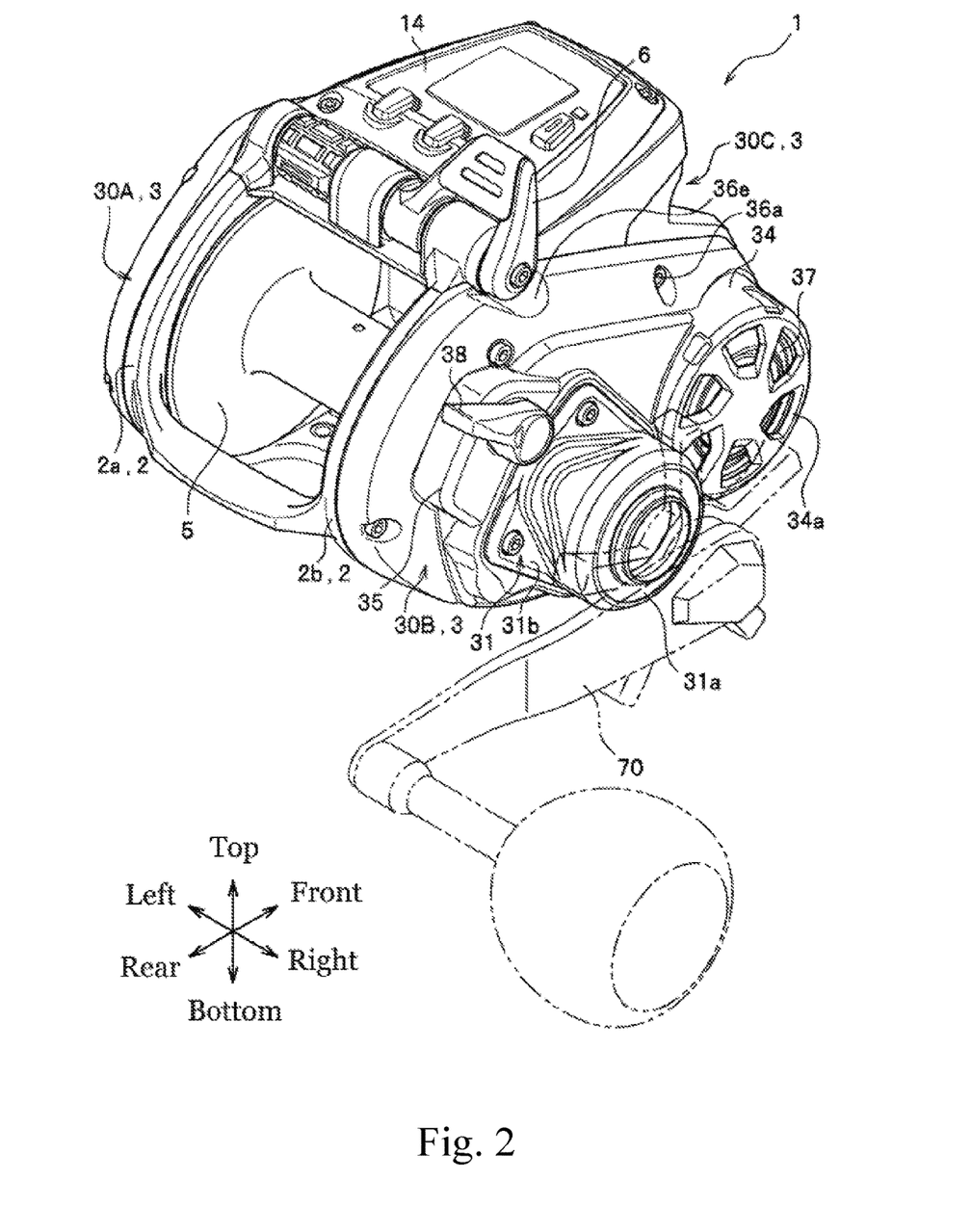
FIG. 2 is a perspective view of the same electric fishing reel as viewed obliquely from above the right rear thereof.

As shown in FIG. 1, the electric fishing reel may include a reel body 1 having a frame 2 and a side plate 3 disposed as a cover member to cover the frame 2. The frame 2, which may constitute the framework of the reel body 1, may include a left frame 2a, a right frame 2b, and a front frame 2c disposed in front of the spool 5 (see FIGS. 5 to 7). The left frame 2a, the right frame 2b, and the front frame 2c as a whole may be integrated together. The left frame 2a, the right frame 2b, and the front frame 2c may be formed separate from each other and integrated together by a fastener, or these frames may be formed so as to be partially integrated together.

The left and right frames 2a, 2b may be integrated together via a plurality of supporting columns (not shown). On a column positioned below (not shown), there may be provided a reel leg (not shown) to be mounted on a reel seat of a fishing rod. The frame 2 including the left frame 2a, the right frame 2b, and the front frame 2c may be formed of a metal material such as an aluminum alloy or a magnesium alloy. On the upper edges of the left and right frames 2a, 2b, there may be placed a counter casing 14.

Figure 5:
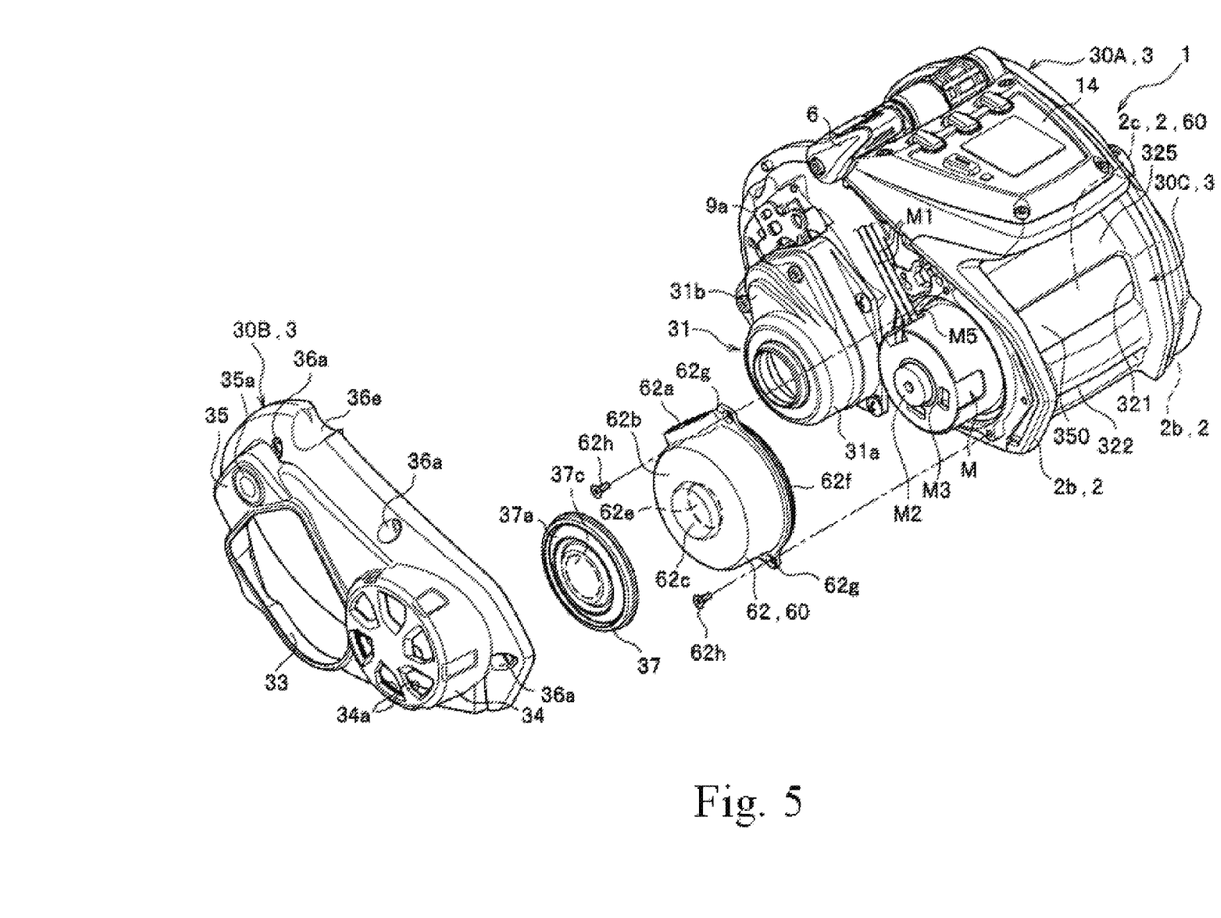
FIG. 5 is an exploded perspective view of the reel body from which a cover unit, a side heat releasing member, and the right side plate are removed.

The front frame 2c may have a substantially cylindrical shape having openings (not shown) for the left and right frames 2a, 2b, and the front frame 2c may house an electric motor M (see FIG. 5). The front frame 2c may serve as a part of a motor casing 60 (see FIG. 5) that may house the electric motor M. Details of the motor casing 60 will be described later.

The side plate 3 may include a left side plate 30A that may cover the left frame 2a, a right side plate 30B that may cover the right frame 2b, and a front side plate 30C that may cover the front frame 2c. The side plate 3 may constitute the portion to be gripped or held by an angler (the portion to be contacted by a hand of the angler).

The left side plate 30A, the right side plate 30B, and the front side plate 30C may be individually formed of a synthetic resin as integral pieces and may be mounted on the left frame 2a, the right frame 2b, and the front frame 2c, respectively.

Further, a support unit 31 may be removably fixed on the right fame 2b. More specifically, the right frame 2b may be covered with two separate members (the right side plate 30B and the support unit 31). As will be described later, the support unit 31 may support a handle shaft 7 of a handle 70 for winding operation and a pinion gear shaft 9j.

As shown in FIG. 1, a spool 5 for winding a fishing line may be rotatably supported between the left and right frames 2a, 2b. The electric motor M may be disposed in front of the spool 5. The spool 5 may be rotationally driven in the direction of winding the fishing line by means of the winding operating of the handle 70 and the rotational drive of the drive motor M via a known reduction mechanism G1 constituting a drive force transmission mechanism. The motor output of the electric motor M may be adjusted up or down by rotational operation of an operation lever 6 in the front-rear direction. The operation lever 6 may be provided on top of the frame 2 and in rear of the counter casing 14.

The spool 5 may include a line winding barrel 5a around which the fishing line is to be wound. Both ends of the spool 5 may be flanges 5b, 5c for constraint of the fishing line being wound. The spool 5 may be supported on a spool shaft 5d via bearings (not shown) between the left and right frames 2a, 2b.

Figure 9:
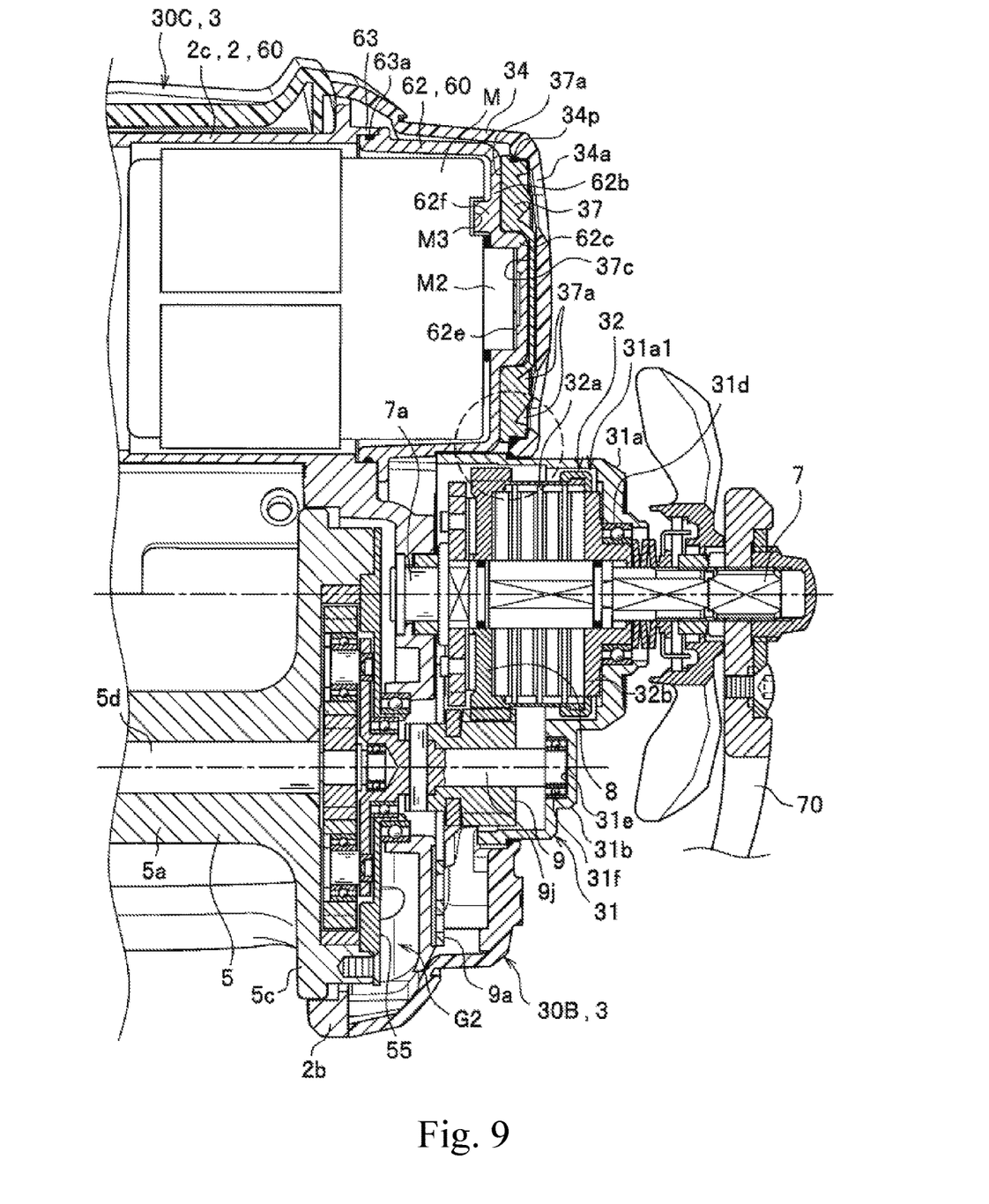
FIG. 9 is an enlarged sectional view along the C-C line in FIG. 4b.

The drive force may be transmitted to the spool 5 via the reduction mechanism G1 and a known reduction mechanism G2 provided on the right frame 2b. The reduction mechanism G1 may be provided on a lateral side of the electric motor M and may be configured to reduce the output of the electric motor M. The rotational drive force reduced by the reduction mechanism G1 may be transmitted to the spool shaft 5d via a known power transmission unit G3. The reduction mechanism G2 may be disposed on the right frame 2b side, and may be configured to reduce the rotational drive force of the spool shaft 5d and transmit it to the spool 5. As shown in FIG. 9, a pinion gear shaft 9j may be connected to the spool 5 via a bracket 55.

The support unit 31 that covers the right frame 2b may be an integral piece made of a metal such as an aluminum alloy or a magnesium alloy. The support unit 31 may be disposed around the handle shaft 7 and fixed directly on the right frame 2b. The right side plate 30B may be disposed to encircle the support unit 31 and may be fixed directly on the right frame 2b. The support unit 31 may be colored by the alumite treatment or the like.

Figure 3A:
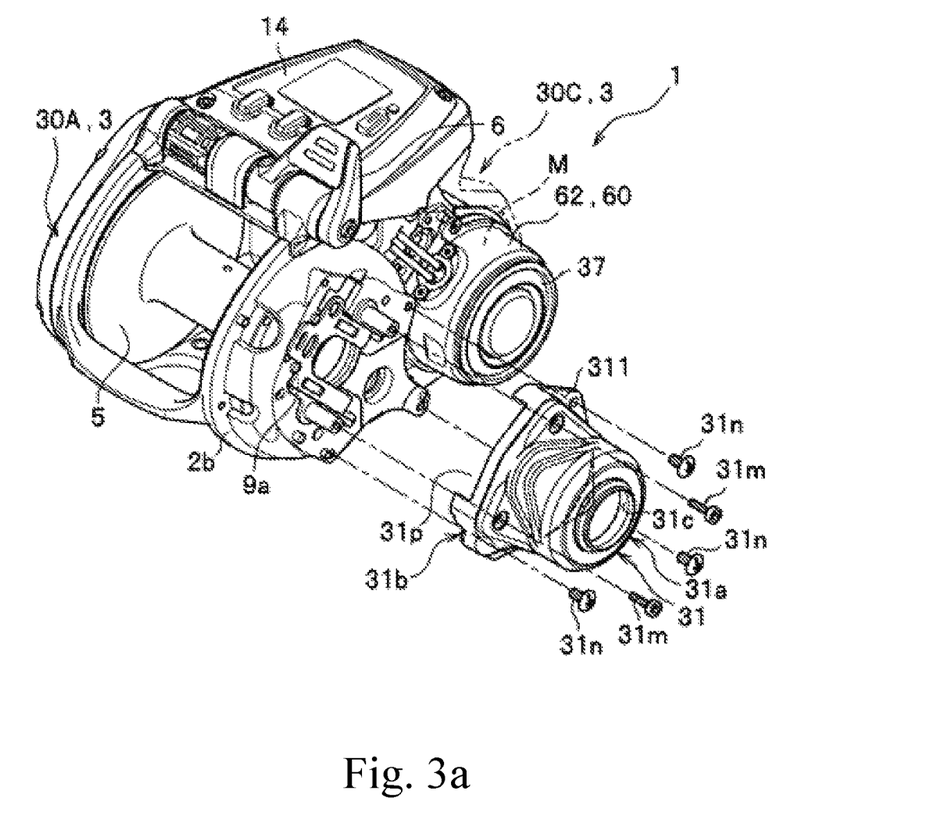
FIG. 3a is an exploded perspective view of a reel body in which a support unit is removed from a right frame.
Figure 3B:
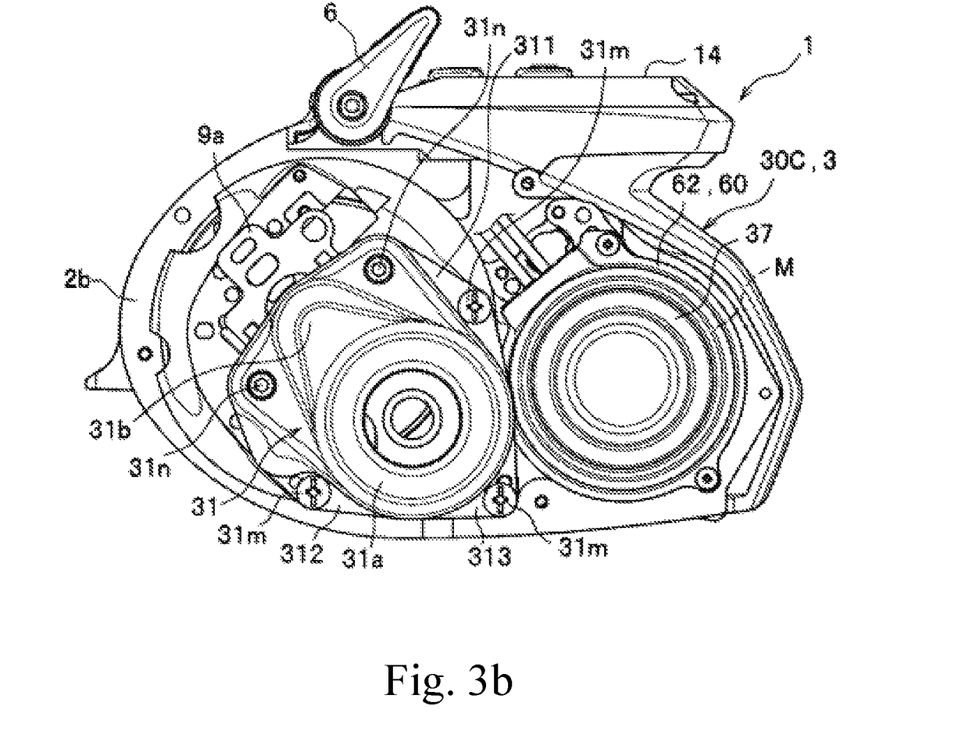
FIG. 3b is a side view of the reel body in which the support unit is fixed on the right frame.

As shown in FIGS. 3A and 3b, the support unit 31 may include a handle shaft support 31a and a pinion gear shaft support 31b. As shown in FIG. 9, the handle shaft support 31a may house a drive gear 8 and a drag mechanism 32 including a plurality of brake plates 32a. The handle shaft support 31a may support one end of the handle shaft 7 via a bearing member 31d and a holder 32b. The handle shaft 7 may be connected frictionally with a drive gear 8 via the drag mechanism 32. The proximal end 7a of the handle shaft 7 may be rotatably supported by the right frame 2b by a known method so as not to come off. In addition, a known anti-reverse device may be provided to permit the handle shaft 7 to rotate in a forward direction for winding the fishing line and prevent the handle shaft 7 from rotating in a reverse direction reverse to the forward direction.

As shown in FIG. 9, a pinion gear 9 may be housed inside the pinion gear shaft support 31b. On a bottom portion 31e of the pinion gear shaft support 31b, a distal end of the pinion gear shaft 9j may be supported via a bearing member 31f serving as a bearing. The pinion gear shaft 9j may be connected to the spool 5. The pinion gear 9 may be in mesh with the drive gear 8. As shown in FIG. 9, a part of a slide plate 9a included in the known clutch mechanism may be housed inside the pinion gear shaft support 31b. As shown in FIGS. 3a and 3b, the support unit 31 may be fixed directly on the right frame 2b with a plurality of fixing screws 31m, 31n. In other words, the support unit 31 may be fixed on the right frame 2b independently of the right side plate 30B.

The right side plate 30B may be separate from the support unit 31 and may be independently fixed on the right frame 2b. The right side plate 30B may have an opening 33 formed therein. The handle shaft support 31a and the pinion gear shaft support 31b of the support unit 31 may project through the opening 33 so as to be exposed to the right side of the right side plate 30B (see FIGS. 2 and 9).

Figure 4A:
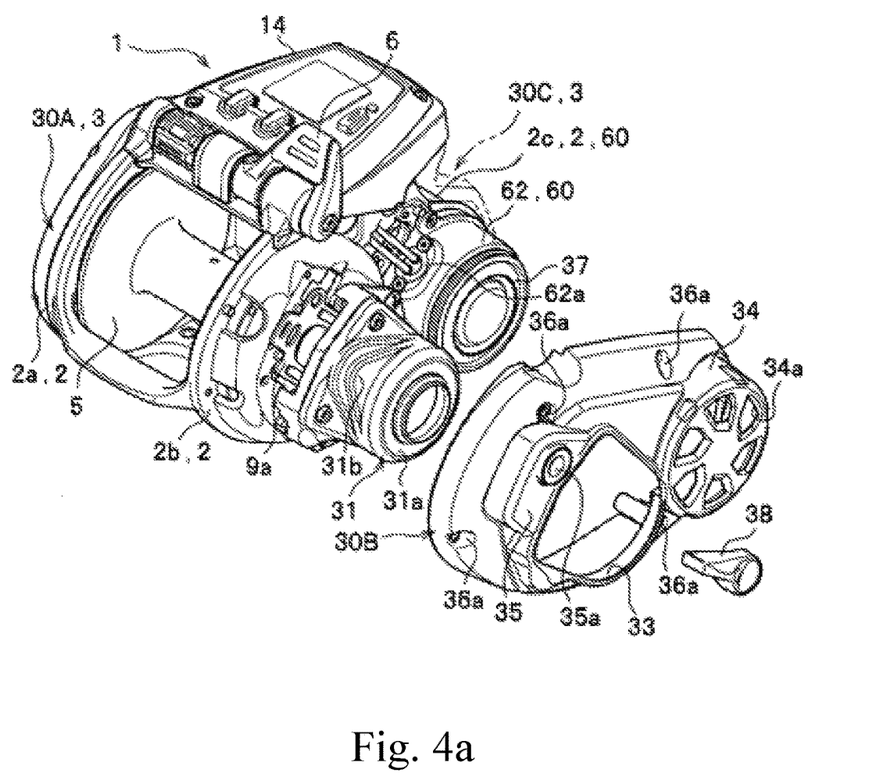
FIG. 4a is an exploded perspective view of the reel body in which a right side plate is removed from the right frame.
Figure 4B:
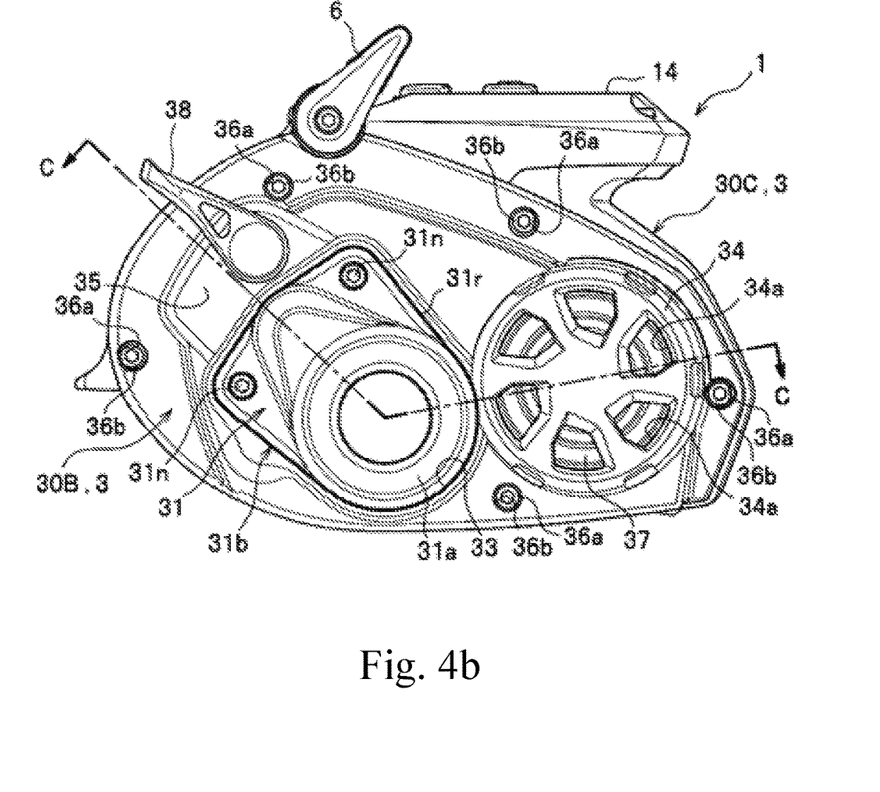
FIG. 4b is a side view of the reel body in which the right side plate is fixed on the right frame.

The right side plate 30B may have a support unit 35 formed on the upper edge in rear of the opening 33. The support 35 may extend toward the right side. As shown in FIGS. 4a and 4b, the support unit 35 may have a substantially rectangular shape as viewed from the side. On the support unit 35, there may be mounted an operation lever 38 for operating the known clutch mechanism. When the operation lever 38 is rotationally operated, the slide plate 9a (see FIGS. 4a and 9) may be slid for engagement and disengagement (switching between on and off states) of the clutch mechanism.

As shown in FIGS. 4a and 4b, the right side plate 30B may have a motor cover 34 formed in the front portion thereof. The motor cover 34 may have a substantially circular shape as viewed from the side. In the motor cover 34, there may be provided a plurality of openings 34a for releasing the heat of the electric motor M (see FIG. 5). As shown in FIG. 5, a side heat releasing member 37 having a disc-like shape may be disposed inside the motor cover 34. The openings 34a may have such a size as not to allow penetration of fingers or the like of the user during fishing.

The side heat releasing member 37 may be formed of a metal material such as an aluminum alloy, a magnesium alloy, or a copper alloy that has excellent heat releasing performance. The side heat releasing member 37 may have a circumferential groove 37a in the right side surface thereof. Because of the presence of the circumferential groove 37a, the side heat releasing member 37 may have a larger heat releasing area in the right side surface thereof. The side heat releasing member 37 can be seen from the lateral side of the motor cover 34 through the openings 34a (the side heat releasing member 37 is exposed in the openings 34a (see FIG. 4b)). As shown in FIG. 9, the side heat releasing member 37 may be tightly attached to the inner surface of the motor cover 34 via an O-ring 34p. The side heat releasing member 37 may be colored by, e.g., the alumite treatment.

Figure 7:
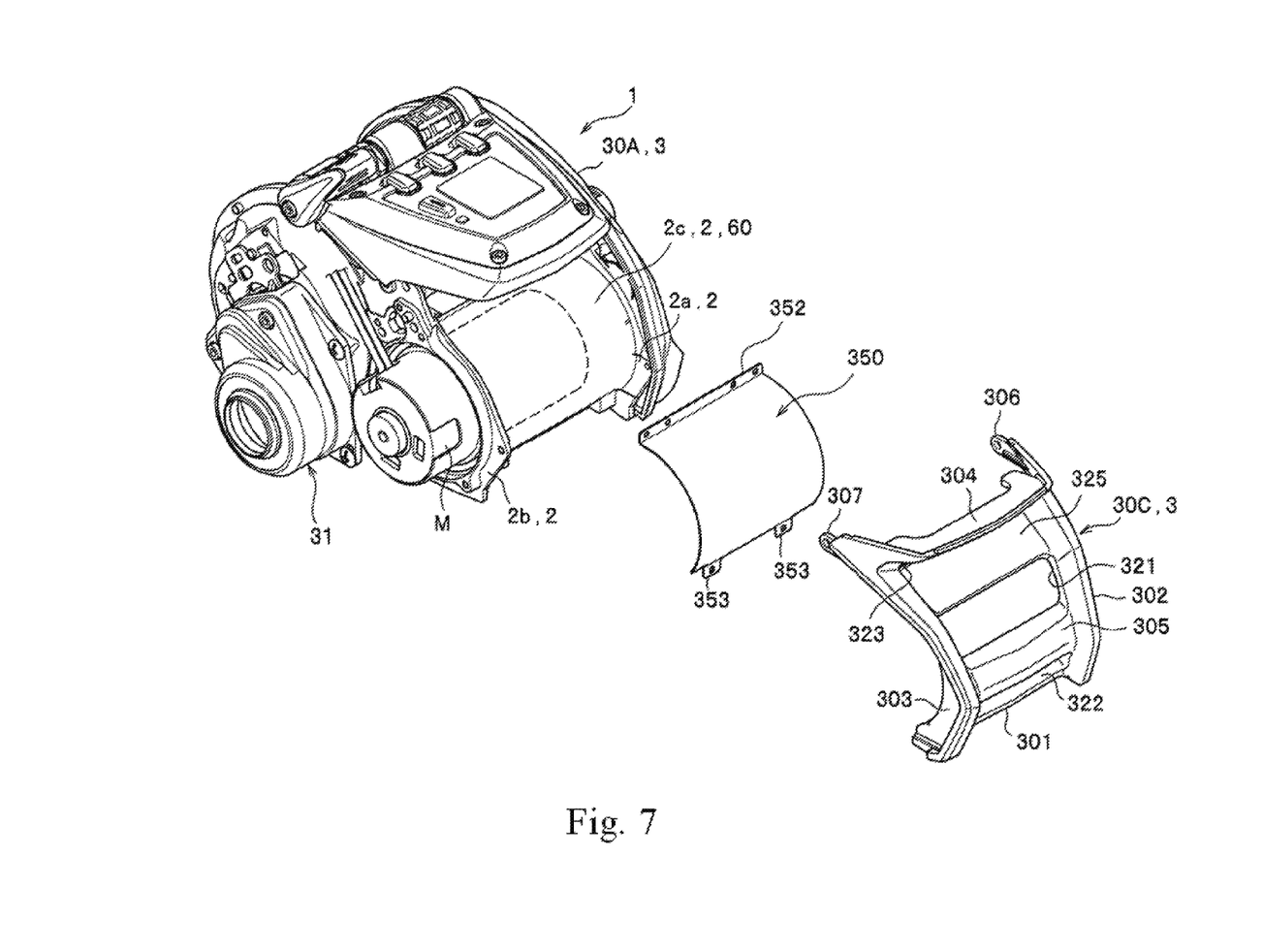
FIG. 7 is an exploded perspective view of the reel body from which a front heat releasing member and the front side plate are removed.

As shown in FIG. 7, the electric motor M may be housed in the motor casing 60. The motor casing 60 may be constituted by the front frame 2c described above and the cover unit 62 (see FIG. 9). The front frame 2c may have such an inner diameter that the electric motor M can be housed in the front frame 2c. The front frame 2c may be integrated with the left and right frames 2a, 2b. The cover unit 62 may cover the right side portion of the electric motor M. The cover unit 62 may have a bottomed cylindrical shape and, as shown in FIG. 9, may be fitted on the right edge portion 63 of the front frame 2c by spigot fitting via an O-ring 63a. As shown in FIG. 5, screws 62h may be inserted through screw holes 62g formed in a flange 62f on the edge of the opening, and the screws 62h may be screwed into the right frame 2b, so as to fix the cover unit 62 on the right frame 2b. In the embodiment, the electric motor M is housed in the motor casing 60, but the motor casing 60 is not necessarily provided.

On the circumferential surface of the cover unit 62, there may be formed a withdrawal hole 62a through which an electric wire M1 of the electric motor M is withdrawn. The electric wire M1 may be withdrawn radially from a leading portion MS (see FIG. 5) of the electric motor M through the withdrawal hole 62a. The electric wire M1 may be connected to an electric wire (not shown) from the counter casing 14 (a control board).

As shown in FIGS. 5 and 9, an engagement portion 62c may be formed in the bottom portion 62b of the cover unit 62 so as to project toward the right side. The engagement portion 62c may be engaged with a circular recess 37c (see FIG. 9) formed in a surface of the side heat releasing member 37 opposed to the engagement portion 62c. As shown in FIG. 9, inside the engagement portion 62c, there may be provided an insertion hole 62e into which a shaft portion M2 of the electric motor M is inserted. On the inner surface (the left side surface) of the bottom portion 62b, there may be formed an engagement projection 62f so as to project toward the electric motor M. The engagement projection 62f can be engaged with an engagement hole M3 provided in the right side portion of the electric motor M. This engagement may cause the right side portion of the electric motor M to be positioned with respect to the cover unit 62.

The heat from the electric motor M may be transmitted to the side heat releasing member 37 via the cover unit 62 that constitutes a part of the motor casing 60, and may be released from the side heat releasing member 37 into the outside air on the right side of the reel body 1 through the openings 34a of the right side plate 30B.

As shown in FIG. 4b, fixing screws 36b may be inserted through screw holes 36a formed in peripheral portions of the right side plate 30B at intervals, and the fixing screws 36b may be screwed into the right frame 2b, so as to fix the right side plate 30B on the right frame 2b.

Figure 6A:
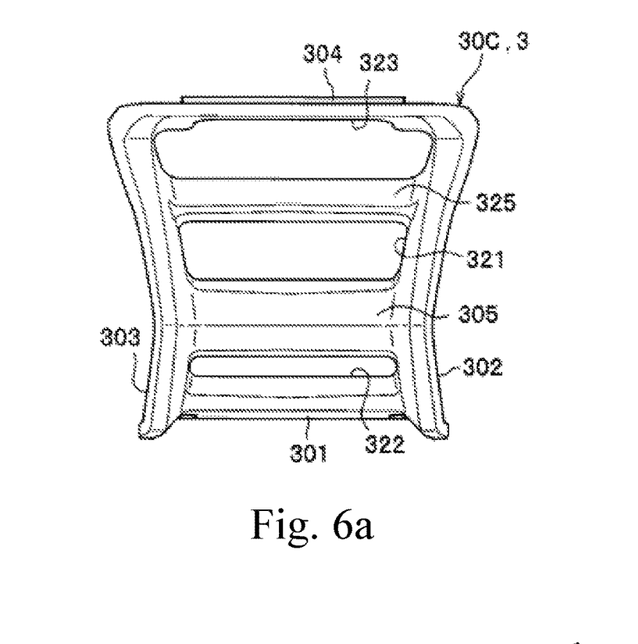
FIG. 6a is a front view of a front side plate.
Figure 6B:
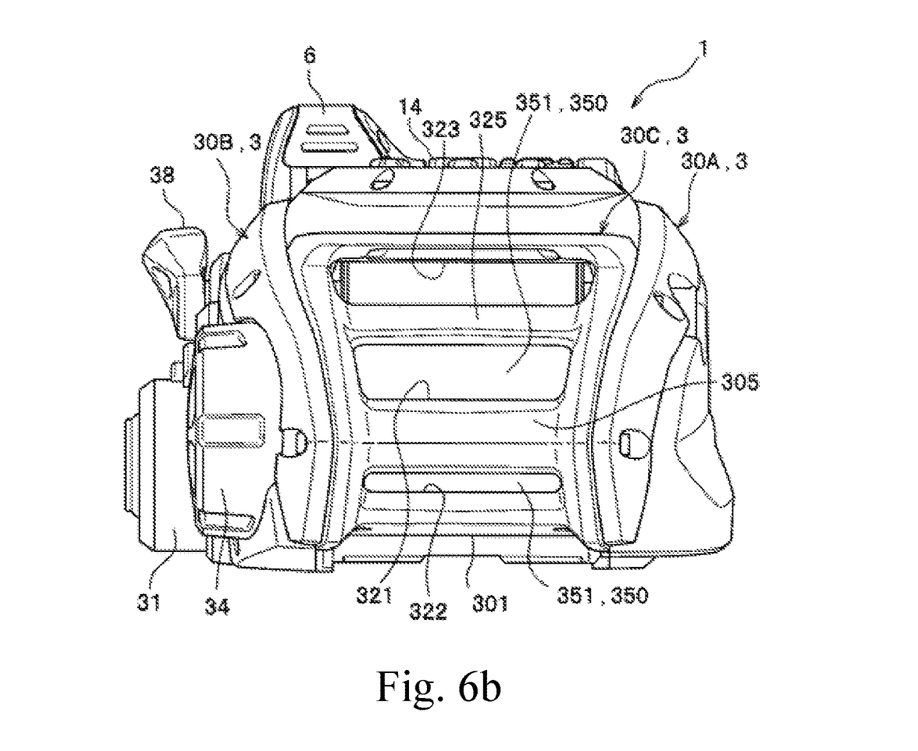
FIG. 6b is a front view of the reel body.

As shown in FIGS. 6 and 7, the front side plate 30C may be mounted on the front frame 2c. The front side plate 30C may serve as a cover that covers a part of the front frame 2c included in the motor casing 60, so as to safeguard fingers. Thus, the front side plate 30C may suitably prevent fingers from accidentally contacting with the motor casing 60. Between the front side plate 30C and the front frame 2C, there may be provided a front heat releasing member 350.

The front side plate 30C may include a lower portion 301, side portions 302, 303, an upper portion 304, a front portion 305, and an inclined portion 325. As shown in FIG. 6a, the front side plate 30C may include a first opening 321 surrounded by the side portions 302, 303, the front portion 305, and the inclined portion 325. The front side plate 30C may also include a second opening 322 surrounded by the side portions 302, 303, the lower portion 301, and the front portion 305. In addition, the front side plate 30C may also include a window hole 323 for guiding a fishing line. The window hole 323 may be surrounded by the side portions 302, 303, the front portion 305, and the upper portion 304. The window hole 323 may extend in the direction of the spool shaft 5d (see FIG. 1) and may be horizontally longer. On the window hole 323, there may be provided a guide member (not shown) for winding the fishing line evenly on the spool 5 (see FIG. 1). The guide member can be moved by a known level-wind mechanism in the left-right direction along the window hole 323.

The first opening 321 and the second opening 322 may extend in the left-right direction to have a shape similar to that of the window hole 323. As shown in FIG. 7, both the openings 321, 322 may be opposed to the front frame 2c (the motor casing 60). As shown in FIGS. 6a and 6b, the first opening 321 may be formed around the vertically middle portion of the front side plate 30C and may be positioned below the window hole 323. The inclined portion 325 may be formed between the window hole 323 and the first opening 321. The inclined portion 325 may include a surface inclined down in the frontward direction from the window hole 323. The first opening 321 may have substantially the same opening area as the window hole 323.

The second opening 322 may be formed below the first opening 321 so as to be adjacent to the front portion 305. The second opening 322 may have a smaller opening area than the first opening 321. As shown in FIG. 6b, the front heat releasing member 350 can be seen through the first opening 321 and the second opening 322. The first opening 321 and the second opening 322 may be safeguarded by the side portions 302, 303 so as not to be directly contacted by the fingers of a user gripping the reel body 1 during fishing, and the motor casing 60 (the front heat releasing member 350) is recessed inside (rearward). The first opening 321 and the second opening 322 may preferably have such a size as not to allow penetration of fingers or the like of the user during fishing.

Figure 8:
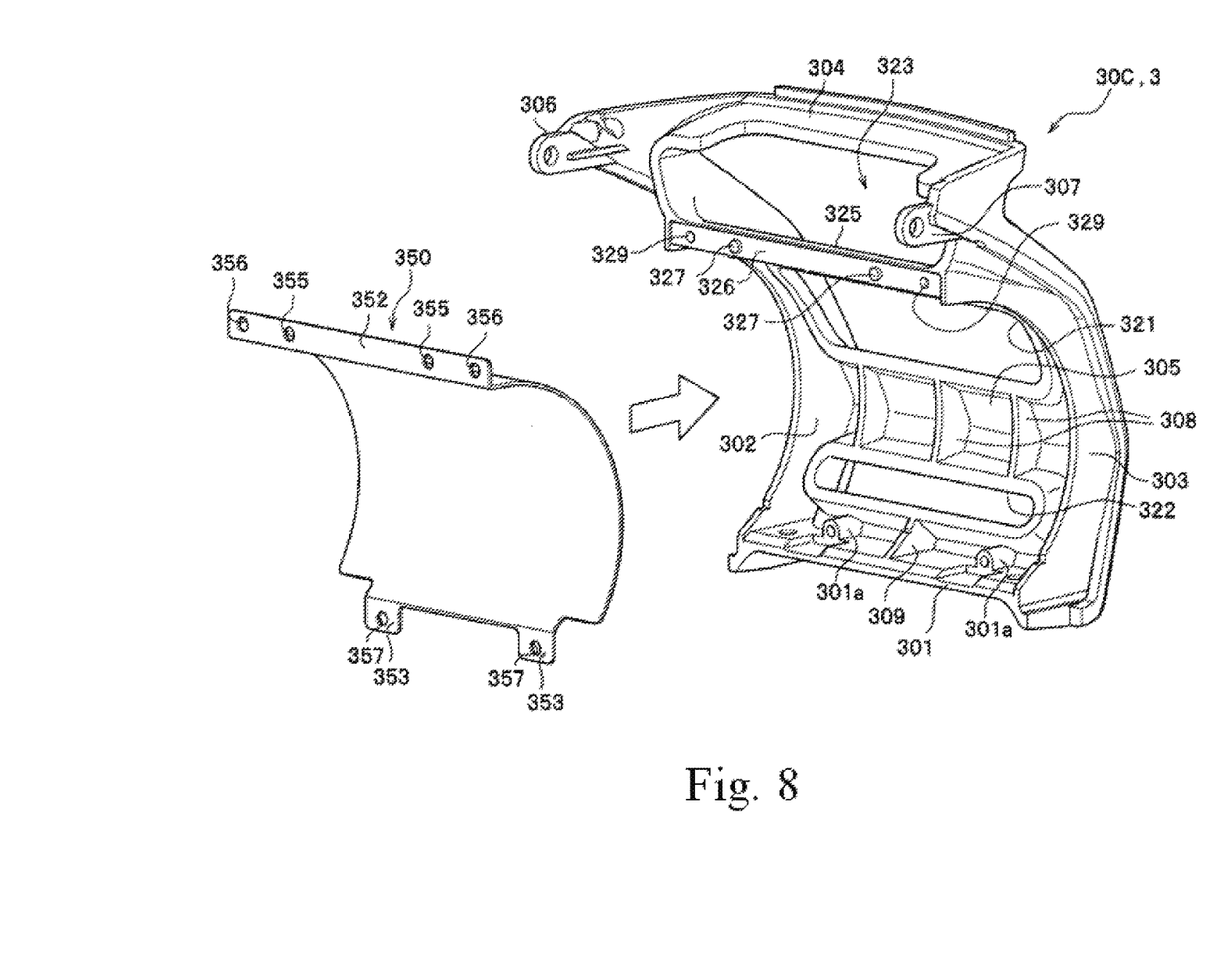
FIG. 8 is an exploded perspective view of the front heat releasing member and the front side plate as viewed obliquely from above the right rear thereof.

As shown in FIG. 8, on the upper end of the side portion 302, there may be formed an extension portion 306 extending rearward and configured to be mounted on the left frame 2a (see FIG. 7). Likewise, on the upper end of the side portion 303, there may be formed an extension portion 307 extending rearward and configured to be mounted on the right frame 2b (see FIG. 7).

As shown in FIG. 8, vertical ribs 308 for reinforcement may be provided on the back surface of the front portion 305. The vertical ribs 308 may extend between the first opening 321 and the second opening 322. Likewise, a vertical rib 309 for reinforcement may be provided on the back surface of the lower portion 301.

On a rear opening edge 326 of the window hole 323, there may be formed left and right engagement projections 327, 327 and left and right screw holes 329, 329. In addition, on the rear surface of the lower portion 301, there may be formed left and right bosses 301a, 301a on opposite sides of the vertical rib 309.

As shown by the white arrow in FIG. 8, the front heat releasing member 350 may be mounted on the back surface of the front side plate 30C. The front heat releasing member 350 may be formed of a thin plate and may have an arc-like cross section that conforms to the outer shape of the front frame 2c, as shown in FIG. 7. The front heat releasing member 350 may be formed of a metal material such as an aluminum alloy, a magnesium alloy, or a copper alloy that has excellent heat releasing performance. The front heat releasing member 350 may be colored by the alumite treatment or the like.

As shown in FIG. 8, on the upper end of the front heat releasing member 350, there may be formed a bend portion 352 bent upward. The bend portion 352 may have left and right engagement holes 355, 355 and left and right screw insertion holes 356, 356. The left and right engagement holes 355, 355 may correspond to the left and right engagement projections 327, 327 and can be engaged with the left and right engagement projections 327, 327. The left and right screw insertion holes 356, 356 may correspond to the left and right screw holes 329, 329 in the front side plate 30C. Screws (not shown) may be inserted through the screw insertion holes 356 and screwed into the screw holes 329 in the front side plate 30C, so as to fix the upper end (the bend portion 352) of the front heat releasing member 350 on the front side plate 30C.

On the other hand, on the lower end of the front heat releasing member 350, there may be formed left and right mounting pieces 353, 353 bent downward. Each of the mounting pieces 353 may have a screw hole 357 formed therein. The screw holes 357 may correspond to the left and right bosses 301a, 301a on the front side plate 30C. Screws (not shown) may be inserted through the screw holes 357 and screwed into the bosses 301a on the front side plate 30C, so as to fix the lower end (the mounting pieces 353) of the front heat releasing member 350 on the front side plate 30C.

The heat from the electric motor M may be transmitted to the front heat releasing member 350 via the front frame 2c that constitutes a part of the motor casing 60, and may be released from the front heat releasing member 350 into the outside air in front of the reel body 1 through the openings 321, 322 of the front side plate 30C. The front heat releasing member 350 may be either tightly attached to the front frame 2c that constitutes a part of the motor casing 60 or opposed to the front frame 2c with a slight gap maintained therebetween. It may also be possible that the front heat releasing member 350 is fixed on the front frame 2c or the left and right frames 2a, 2b instead of the front side plate 30C.

In the above-described electric fishing reel according to the embodiment, the electric motor M is covered by the front side plate 30C and the right side plate 30B, and the heat transmitted from the electric motor M to the motor casing 60 (the front frame 2c, the cover unit 62) can be released into the outside air through the first opening 321, the second opening 322, and the openings 34a. Therefore, it may be possible to prevent fingers of a user from contacting with the motor casing 60 and improve the heat releasing performance of the motor casing 60. This may enhance the fishing operability and the durability of the electric motor M.

Since the ordinary members such as the front side plate 30C and the right side plate 30B include the openings 321, 322, and 34a, the heat transmitted from the electric motor M to the motor casing 60 can be released into the outside air, thus improving the heat releasing performance of the motor casing 60 without major design modification.

Further, since the front side plate 30C includes the inclined portion 325 between the window hole 323 and the first opening 321, waterdrops adhered to the fishing line can be dropped onto the inclined portion 325 when the fishing line being wound passes through the window hole 323. The waterdrops dropped onto the inclined portion 325 may flow down the inclined portion 325 into the first opening 321. Thus, the waterdrops flowing into the first opening 321 may suitably cool the front heat releasing member 350 (the motor casing 60). Since the front heat releasing member 350 (the motor casing 60) can be cooled using the waterdrops adhered to the fishing line being wound, it may be possible to prevent fingers of a user from contacting with the motor casing 60 and improve the heat releasing performance of the motor casing 60.

Since the first opening 321 extends in the direction of the spool shaft 5d in conformity to the window hole 323, the waterdrops dropped from the fishing line passing through the window hole 323 onto a region across the length of the window hole 323 may flow down the inclined portion 325 and enter the first opening 321 when it comes to a region across the length of the first opening 321. Thus, the region of the front heat releasing member 350 (the motor casing 60) across the length of the first opening 321 can be cooled by the waterdrops.

Since the side heat releasing member 37 for receiving the heat from the motor casing 60 is disposed inside the openings 34a, and the front heat releasing member 350 for receiving the heat from the motor casing 60 is disposed inside the first opening 321, the heat of the motor casing 60 can be efficiently released through these members into the outside air. Therefore, it may be possible to prevent fingers of a user from contacting with the motor casing 60 and improve the heat releasing performance of the motor casing 60 further.

Embodiments of the present invention are not limited to the above descriptions and are susceptible to various modifications. For example, in the above embodiment, the front side plate 30C may include the first opening 321 and the second opening 322, and the right side plate 30B may include the openings 34a. This feature is not limitative, and it may also be possible that only one of the front side plate 30C and the right side plate 30B includes these openings. In addition, the front side plate 30C may not necessarily include both of the first opening 321 and the second opening 322, but may include only one of them. The number and the shapes of the first opening 321, the second opening 322, and the openings 34a are not limited but may be modified in accordance with the design.

The first opening 321 may be replaced with slits arranged at such intervals as not to allow penetration of the fingers of a user. The presence of the slits may ensure that the fingers of a user are prevented from contacting with the front heat releasing member 350 during fishing.

It may also be possible that the front heat releasing member 350 and the side heat releasing member 37 are not provided. In this case, the motor casing 60 may directly face the openings 34a of the right side plate 30B and the first opening 321 and the second opening 322 of the front side plate 30C.

What is claimed is:

1. An electric fishing reel comprising:
   a reel body;
   a spool provided on the reel body and configured to have a fishing line wound thereon;
   an electric motor provided in a front portion of the reel body and configured to rotationally drive the spool; and
   a cover member mounted on the reel body so as to surround the electric motor,
   wherein the cover member includes a front portion situated in front of the electric motor and a side portion situated on a side of the electric motor, and
   at least the front portion of the cover member has an opening formed therein,
   wherein the front portion of the cover member is made of a front side plate disposed on the front portion of the reel body, and
   wherein the front side plate includes a window hole extending in an axial direction of the spool and configured to guide the fishing line, and the opening is disposed below the window hole.

2. The electric fishing reel of claim 1, wherein the front side plate includes an inclined portion disposed between the opening and the window hole, and wherein the inclined portion is inclined down in a frontward direction from the window hole.

3. The electric fishing reel of claim 1, wherein the opening extends in the axial direction of the spool in conformity to the window hole such that the opening has substantially the same opening area as the window hole.

4. The electric fishing reel of claim 1, wherein the opening is safeguarded so as not to be directly contacted by fingers of an user.

5. The electric fishing reel of claim 1, wherein the opening has such a size as to inhibit penetration of fingers of a user.

6. The electric fishing reel of claim 1, wherein the side portion of the cover member is made of a side plate disposed on a side portion of the reel body.

7. The electric fishing reel of claim 1 wherein a heat releasing member for receiving heat from the electric motor is disposed inside the opening.

8. The electric fishing reel of claim 1 further comprising a motor casing that houses the electric motor.

* * * * *